US006821422B1

(12) United States Patent
Brzozowski et al.

(10) Patent No.: US 6,821,422 B1
(45) Date of Patent: Nov. 23, 2004

(54) STRAINER ASSEMBLY

(75) Inventors: Marc A. Brzozowski, Manchester, CT (US); Daniel A. Gilmour, West Hartford, CT (US); Wayne A. Ley, Middletown, CT (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 0 days.

(21) Appl. No.: 10/461,805

(22) Filed: Jun. 13, 2003

(51) Int. Cl.[7] ...................... F02M 37/22; B01D 35/027
(52) U.S. Cl. ..................... 210/416.4; 210/460
(58) Field of Search ................ 210/416.1, 416.4, 210/459, 460

(56) References Cited

U.S. PATENT DOCUMENTS

| | | | |
|---|---|---|---|
| 2,937,755 A | * | 5/1960 | Szwargulski ............... 210/172 |
| 5,186,152 A | * | 2/1993 | Cortochiato et al. ........ 123/514 |
| 5,647,329 A | | 7/1997 | Bucci et al. |
| 5,702,237 A | | 12/1997 | Hill |
| 5,728,292 A | * | 3/1998 | Hashimoto et al. ......... 210/136 |
| 5,809,975 A | | 9/1998 | Tuckey et al. |
| 6,264,831 B1 | * | 7/2001 | Hawkins et al. .............. 210/86 |
| 6,540,909 B2 | * | 4/2003 | Smith et al. .................. 210/95 |

* cited by examiner

*Primary Examiner*—Fred G. Prince
(74) *Attorney, Agent, or Firm*—Reising, Ethington, Barnes & Kisselle, P.C.

(57) ABSTRACT

A strainer constructed for attachment to an inlet of a fuel pump has at least one layer of permeable material forming a cavity. A body is disposed at least in part in the cavity and has at least one tubular portion arranged for fluid communication with the inlet of the fuel pump to provide a substantially unrestricted flow path leading from the filter to the inlet of the fuel pump, while inhibiting vapor from entering the fuel pump.

20 Claims, 2 Drawing Sheets

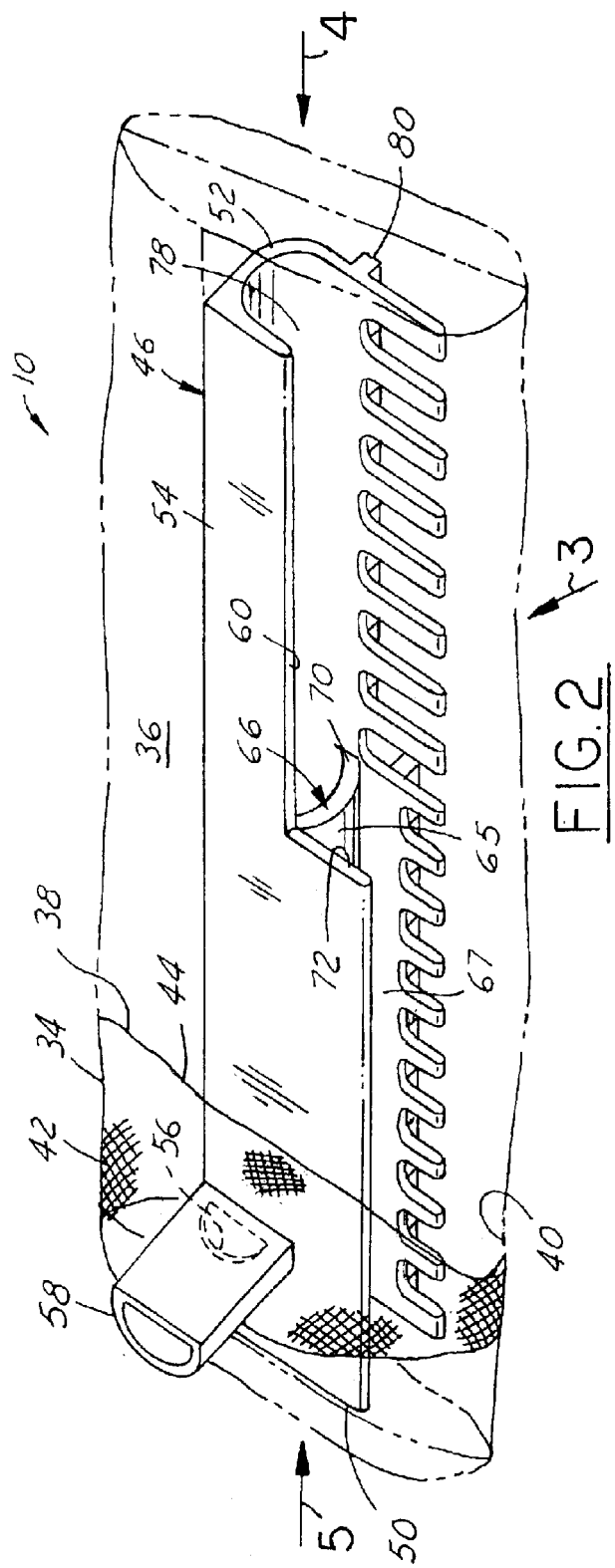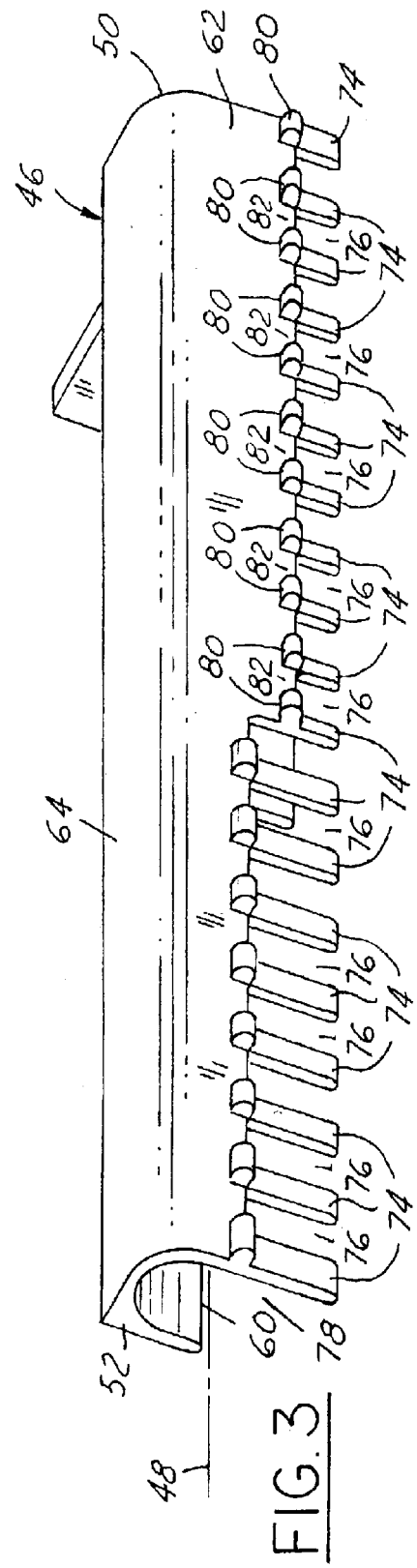

STRAINER ASSEMBLY

FIELD OF THE INVENTION

This invention relates generally to filters or strainers, and more particularly to strainers used for filtering fluid upstream of a pump.

BACKGROUND OF THE INVENTION

It is well known to provide a pump, such as a fuel pump within a fuel tank, with a filter or strainer upstream of the pump to inhibit contaminants or debris from entering the pump. It is also known to construct strainers having an outer layer of material, such as nylon, defining an inner cavity wherein anti-collapsing features are disposed to prevent the filter material from collapsing on itself. During operation, an inlet of the pump draws liquid, such as fuel within a fuel tank, through the strainer and into the pump. Desirably, the fuel is drawn into the pump without interruption, such as that which can occur by the introduction of vapor into the pump. If vapor does enter the pump, a condition known as "vapor lock" can result. Vapor lock typically results in problems downstream of the pump, such as engine sputter or stall.

Vapor lock is more likely to occur during certain conditions of operation, such as during turning of a vehicle or during low fuel conditions. To assist in inhibiting vapor from being drawn into the pump during these conditions, strainers are commonly constructed to provide a capillary seal when wet but not immersed in liquid fuel to prevent or at least inhibit the passage of fuel vapor therethrough. The capillary seal is generated at least in part by the surface tension of the fuel throughout the outer layer of the wetted filter material. The capillary seal typically provides for the drawing of fuel instead of drawing vapor through other portions of the filter in contact with liquid fuel and not through those portions of the filter not immersed in liquid fuel. However, if the capillary seal is broken or overcome by a pressure differential across the filter, fuel vapor can be drawn into the filter and ultimately into the pump.

The use of anti-collapsing features can increase the likelihood that fuel vapor will be drawn into the pump because they typically create a tortious path through which the fuel must flow in order to get to the inlet of the fuel pump. This makes it more difficult to draw fuel from a portion of the strainer that is remote from the inlet of the fuel pump. This in turn can increase the pressure differential across portions of the strainer adjacent the inlet of the pump. If these portions of the strainer are exposed to vapor, then vapor may be drawn into the pump due to the increased pressure differential. As such, vapor lock is more likely to result if the fuel is inhibited or restricted from flowing directly to the inlet of the fuel pump.

SUMMARY OF THE INVENTION

A strainer for a fuel pump enables substantially unrestricted flow of fuel into the inlet of the fuel pump, while inhibiting vapor from entering the fuel pump. The strainer has at least one layer of permeable material forming a substantially enclosed cavity having at least one wall. A body is disposed at least in part in the cavity such that the body has a surface adjacent to at least a portion of the wall. The body has at least one tubular portion arranged for fluid communication with the inlet of the fuel pump. The tubular portion provides a fuel flow path to the fuel pump inlet that has reduced or minimal resistance.

Objects, features and advantages of this invention include providing a strainer for a fuel pump that inhibits collapsing of walls of the strainer, inhibits fuel vapor or air from flowing into the fuel pump, provides for generally unrestricted flow of liquid fuel into the fuel pump, reduces the potential sources for vapor entry into the fuel pump, facilitates drawing liquid fuel to the fuel pump from remote portions of the filter, increases the efficiency of the fuel pump, provides a more consistent flow of liquid fuel from the fuel pump, is compact, rugged, durable, of relatively simple design and economical manufacture and assembly, and has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

FIG. 2 is an enlarged isometric view of the strainer of FIG. 1 with portions broken away shown in phantom lines;

FIG. 3 is an enlarged isometric view of a body of the strainer looking in the direction of arrow 3 of FIG. 2;

DETAILED DESCRIPTION OF THE PREFERRED EMBODIMENTS

Figure 1:
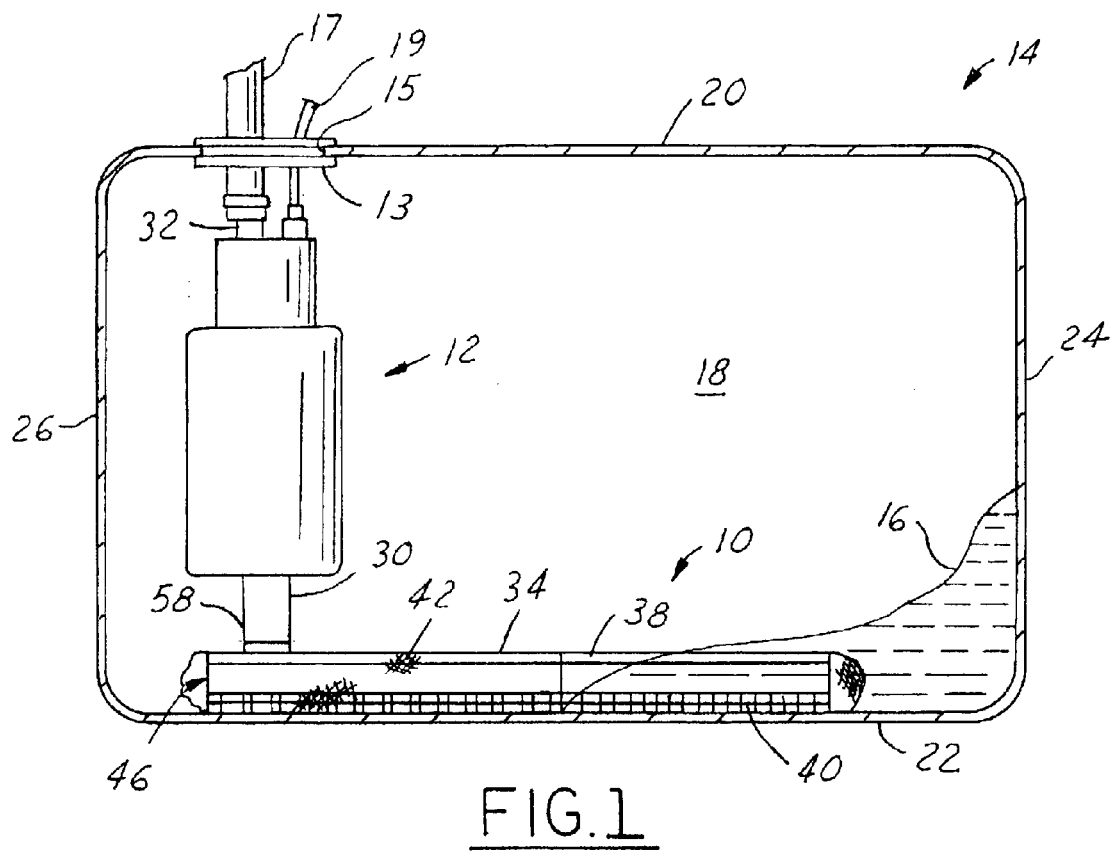
FIG. 1 is a schematic side view of a presently preferred configuration of a strainer embodying the present invention and a fuel pump disposed within a fuel tank.

Referring in more detail to the drawings, FIG. 1 illustrates a strainer assembly 10 connected to a fuel pump 12 within a fuel tank 14 of an automotive vehicle. The fuel tank 14 has fuel 16 therein, and in FIG. 1, the fuel 16 is shown dispersed or "sloshed" to one side of the fuel tank 14, such as may occur when a vehicle is turning, or traveling on a hill, and occurs especially when the level of the fuel 16 within the tank 14 is low. The strainer assembly 10 inhibits contaminants and debris from entering the fuel pump 12 with a reduced or minimal restriction to fuel flow to the fuel pump 12. Additionally, the strainer assembly 10 is constructed to inhibit vapor 18 from flowing through the strainer assembly 10 and into the fuel pump 12. This reduces the likelihood that "vapor lock" will occur, increases the efficiency of the fuel pump, and provides a more consistent flow of liquid fuel from the fuel pump to the operating engine of the vehicle.

The fuel tank 14 has a top surface 20 and bottom surface 22 with a circumferentially continuous side wall, shown here as a pair of opposite side walls 24, 26 therebetween. The fuel tank 14 has at least one opening 15 through which various conduits and wires may pass into and out of the fuel tank 14. The opening 15 is typically sealed by a flange or cap 13 permitting, for example, a fuel line 17 and an electrical wire or harness 19 to connect therethrough. The fuel tank 14 is shown here having fuel 16 in a "low level" condition such that during turning or cornering of the moving vehicle, the fuel 16 is caused to "slosh" to a side of the fuel tank 14, shown here as sloshing toward the side wall 24. With the fuel 16 sloshed toward a side wall of the fuel tank 14, vapor 18 within the fuel tank 14 is more likely to be drawn into the fuel pump 12, as will be discussed in more detail below.

The fuel pump 12 has an inlet 30 through which fuel is drawn from the fuel tank and an outlet 32 through which fuel is discharged under pressure for delivery to an engine (not shown). The fuel pump 12 may be of any suitable type such as, for example, turbine or positive displacement, and may be driven by an electric motor, as is known in the art. The fuel pump and strainer may be positioned within a reservoir within the tank while still serving the same functions and providing the same benefits.

As best shown in FIG. 2, the strainer assembly 10 has at least one layer of fuel permeable material 34 forming a substantially enclosed cavity 36 having at least one and shown here as a pair of generally laterally spaced walls 38, 40. The material 34 may be of a fine mesh or other permeable material permitting liquid fuel flow therethrough, but preventing contaminants larger than a predetermined size from entering the fuel pump. Though the walls 38, 40 may be formed from a single layer of permeable material, preferably several layers of material, such as woven nylon for example, are constructed having various porosities to filter the fuel 16. Preferably, an outer layer 42 of the material 34 has a relatively coarse porosity to filter out larger contaminants, while an inner layer 44 has a relatively fine porosity to filter out smaller contaminants. This facilitates removal of more finely sized particles from the fuel 16 as the fuel 16 flows from the fuel tank 14 into the cavity 36 of the strainer assembly 10. It should be recognized that any suitable material or materials may be used to construct the fuel permeable material 34, and that nylon is not the only material that can be used.

As best shown in FIGS. 2 and 3, the strainer assembly 10 has a body 46 disposed at least in part in the cavity 36. The body 46 has an axis 48 and terminates at opposite ends 50, 52. The body 46 is preferably formed of a plastic or polymer in an injection molding process and has an upper wall 54 preferably maintained adjacent to at least a portion of one of the walls 38. Preferably, the upper wall 54 is molded integrally to at least a portion of one of the walls of the fluid permeable material 34, shown here as wall 38. Preferably, the body 46 is molded to the permeable material 34 while the material 34 is laid out in a generally flat orientation, and thereafter the permeable material 34 is folded about itself and around the body 46 to form the enclosed cavity 36. Any suitable method, such as heat staking for example, may be used to bond, crimp or otherwise join the permeable material 34 about its edges to construct the cavity 36.

The upper wall 54 has an opening 56 formed therein with a connection tube 58 extending laterally therefrom adjacent the end 50. The connection tube 58 is arranged for attachment to the inlet 30 of the fuel pump 12. Preferably, the connection tube 58 is molded as one piece integrally with the upper wall 54 to facilitate assembly as well as to eliminate a potential leak path.

Preferably, the body 46 has a recessed portion 60 extending from the end 52 generally along the longitudinal axis 48 and toward the other end 50. The recessed portion 60 facilitates fuel flow through the strainer assembly 10 and into the fuel pump 12.

Figure 4:
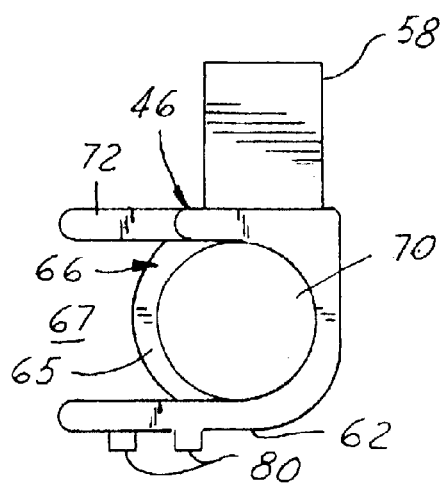
FIG. 4 is an end view of a body of the strainer looking in the direction of arrow 4 of FIG. 2.
Figure 5:
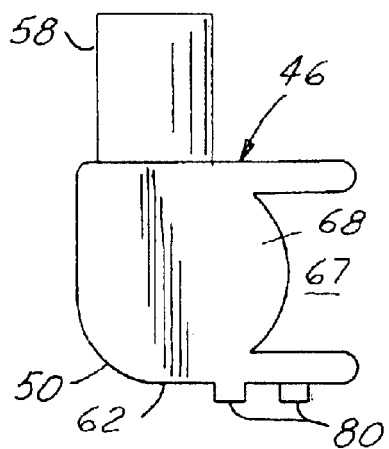
FIG. 5 is an end view of the strainer looking in the direction of arrow 5 of FIG. 2.

The body 46 has a bottom wall 62 generally opposite the upper wall 54 with a side wall 64 spanning between the walls 54, 62. A partial side surface 65 extends from the end 50 toward the other end 52, and with corresponding portions of the walls 54, 62, and 64 defines a tubular portion 66 and an at least partially enclosed area 67 below the tubular portion 66. As best shown in FIGS. 4 and 5, the tubular portion 66 is formed having a closed end 68 adjacent the end 50 of the body 46 and is in fluid communication with the inlet 30 of the fuel pump 12 via the connection tube 58. The tubular portion 66 extends generally laterally between the laterally spaced walls 38, 40 and generally along the longitudinal axis 48 of the body 46 from the closed end 68 toward the end 52 of the body 46. The tubular portion 66 is shown extending less than the entire length of the body 46. Preferably, the tubular portion 66 extends at least halfway between the opposite ends 50, 52 of the body 46 to an open end 70, as shown in FIGS. 2 and 4, of the tubular portion 66. As shown in FIG. 2, the open end 70 of the tubular portion 66 preferably extends to a shoulder 72 defined by the recessed portion 60. As such, a substantially unrestricted flow path for the flow of fuel through the permeable material 34 is provided from the recessed portion 60, into the open end 70 of the tubular portion 66, and into the inlet 30 of the fuel pump 12.

As best shown in FIG. 3, preferably a plurality of spaced apart teeth 74 extend from the bottom wall 62 with openings or spaces 76 between adjacent teeth 74. Fuel 16 is free to flow substantially unrestricted through the spaces 76 into the open end 70 of the tubular portion 66. While facilitating fuel flow into the tubular portion 66, the teeth 74 also inhibit the walls 38, 40 of the permeable material 34 from collapsing against one another or against the body 46.

An open channel portion 78 is defined by the body 46 spaced from the tubular portion 66 and extending generally between the end 52 of the body 46 and the open end 70 of the tubular portion 66. The teeth 74 that extend from the channel portion 78 are generally opposite the recessed portion 60 and are shown here as being longer than the teeth 74 extending from the tubular portion 66. It should be recognized that the teeth 74 may be formed to a variety of lengths or may all be the same length, as desired.

The layers of permeable material 34, 42 and 44 are flexible and pliable and the body 46 is sufficiently rigid so that it will not collapse due to the pressure differential across the layers produced by the operating fuel pump when the capillary seal of the permeable material is inhibiting fuel vapors and air from flowing through the strainer 10 and into the inlet of the operating fuel pump. By preventing the walls 38, 40 of the permeable material 34 from collapsing against one another, or against the body 46, a substantially unrestricted flow path is maintained in the strainer 10. The unrestricted flow path can be comprised of the channel portion 78 extending the length of the body 46, or the tubular portion 66 extending the length of the body 46, or a combination of the tubular portion 66 and the channel portion 78. Hence, the strainer 10 prevents the creation of increased pressure differentials across any portion of it as can occur with restrictions in the flow path of a strainer. Therefore, a capillary seal established by the surface tension of the fuel 16 across the layer or layers 42, 44 of wetted permeable material 34 is more likely to remain intact. The capillary seal prevents or at least restricts fuel vapor from passing through the material 34 and into the fuel pump. This reduces cavitation and the likelihood that vapor lock will occur. Also, the substantially unrestricted flow paths in the strainer permits liquid fuel at the end 52 of the strainer remote from the fuel pump inlet to be drawn into the strainer 10, and then into the fuel pump 12. This can result in a more consistent supply of liquid fuel from the fuel pump even in low fuel level conditions.

To further facilitate the flow of fuel 16 from the fuel tank 14 into the fuel pump 12, and further prevent the permeable material 34 from collapsing about the body 46, a plurality of spaced apart protrusions 80 preferably extend generally laterally relative to the plurality of teeth 74 and spaces 82 are defined between the protrusions 80. The protrusions 80 help to maintain the permeable material 34 away from the body 46. As best shown in FIG. 3, the protrusions 80 preferably extend from a base portion of the teeth 74. The liquid fuel 16 is free to flow between the permeable material 34 surrounding the body 46, through the spaces 82, 76 into the area 67 and the channel portion 78, and into the tubular portion 66. It should be recognized that any number of protrusions 80 may be formed extending from the body 46, and they may be formed in locations other than those shown here to prevent the permeable material 34 from collapsing on the body 46, as well as collapsing on itself.

The above description is intended to illustrate a presently preferred embodiment of the invention. The relative terms such as top, bottom, side, and others used herein are merely words of description with reference to the orientation of the apparatus as shown in FIG. 1. Various modifications within the spirit and scope of the invention will be readily apparent to those skilled in the art. The invention is defined by the claims.

We claim:

1. A strainer for a fuel pump, comprising:
    at least one layer of fuel permeable material forming a cavity; and
    a body disposed at least in part in the cavity so that the body is engageable with said at least one layer of fuel permeable material and having at least one tubular portion disposed at least in part in the cavity and arranged for fluid communication with an inlet of the fuel pump providing a substantially unrestricted flow of fuel through the at least one layer of permeable material, into the tubular portion in the cavity, and into the inlet of the fuel pump while inhibiting vapor from entering the fuel pump.

2. The strainer of claim 1 wherein said cavity is defined at least in part by a pair of laterally spaced walls of the fuel permeable material.

3. The strainer of claim 2 wherein said tubular portion extends generally laterally between said laterally spaced walls.

4. The strainer of claim 1 wherein the tubular portion extends less than the entire length of the body and a channel portion is defined at least in part by the body spaced from the tubular portion.

5. The strainer of claim 1 further comprising a connector tube molded as one piece with the body and in fluid communication with the at least one tubular portion and arranged for connection to the inlet of the fuel pump.

6. The strainer of claim 1 wherein the body extends substantially across the length of the cavity.

7. The strainer of claim 6 wherein the tubular portion extends at least halfway across the length of the cavity.

8. A strainer for a fuel pump, comprising:
    at least one layer of fuel permeable material forming a cavity; and
    a body disposed at least in part in the cavity and having at least one tubular portion arranged for fluid communication with an inlet of the fuel pump providing a substantially unrestricted flow of fuel through the at least one layer of permeable material, into the tubular portion and into the inlet of the fuel pump while inhibiting vapor from entering the fuel pump, said cavity having at least one wall and said body having a surface molded integrally to at least a portion of said at least one wall.

9. A strainer for a fuel pump, comprising:
    at least one layer of fuel permeable material forming a cavity; and
    a body disposed at least in part in the cavity and having at least one tubular portion arranged for fluid communication with an inlet of the fuel pump providing a substantially unrestricted flow of fuel through the at least one layer of permeable material, into the tubular portion and into the inlet of the fuel pump while inhibiting vapor from entering the fuel pump, and a plurality of teeth projecting from the body defining spaces between the teeth through which fuel is free to flow substantially unrestricted into the tubular portion.

10. The strainer of claim 9 wherein the teeth project from a surface of the body generally opposite the surface maintained adjacent said at least one wall.

11. The strainer of claim 9 further comprising a plurality of protrusions extending generally laterally relative to the plurality of teeth defining spaces between the protrusions through which fuel is free to flow further providing the substantially unrestricted flow of fuel into the tubular portion.

12. A strainer for a fuel pump, comprising:
    at least one layer of fuel permeable material forming a cavity; and
    a body disposed at least in part in the cavity and having at least one tubular portion arranged for fluid communication with an inlet of the fuel pump providing a substantially unrestricted flow of fuel, through the at least one layer of permeable material, into the tubular portion and into the inlet of the fuel pump while inhibiting vapor from entering the fuel pump, wherein the tubular portion extends less than the entire length of the body and a channel portion is defined at least in part by the body spaced from the tubular portion and a recessed portion in the channel portion provides at least in part substantially unrestricted flow of fuel into the tubular portion.

13. The strainer of claim 12 further comprising a plurality of teeth projecting from the body, and spaces defined between the teeth through which fuel is free to flow substantially unrestricted into the tubular portion.

14. The strainer of claim 13 wherein the plurality of teeth extend from the body in the area of the tubular portion and the channel portion, wherein the teeth extending from the channel portion are longer than the teeth extending from the tubular portion.

15. The strainer of claim 14 wherein the teeth extending from the channel portion are generally opposite the recessed portion.

16. A strainer for a fuel pump, comprising:
    at least one layer of fuel permeable material forming a cavity; and
    a body disposed at least in part in the cavity and having surfaces engageable with said at least one layer of fuel permeable material and defining a substantially unrestricted and unobstructed flow path defined at least in part in the cavity and arranged for fluid communication with an inlet of the fuel pump providing a substantially unrestricted flow of fuel through the at least one layer of permeable material into the inlet of the fuel pump while inhibiting vapor from entering the fuel pump.

17. The strainer of claim 16 further comprising a plurality of teeth projecting from the body defining spaces between the teeth through which fuel is free to flow substantially unrestricted into the inlet of the fuel pump.

18. The strainer of claim 17 further comprising a plurality of protrusions extending generally relative to the plurality of teeth defining spaces between the protrusions through which fuel is free to flow further providing for the substantially unrestricted flow of fuel into the inlet of the fuel pump.

19. The strainer of claim 16 wherein said cavity has a pair of laterally spaced walls and said body has a tubular portion extending generally laterally between said laterally spaced walls.

20. The strainer of claim 19 wherein the tubular portion extends less than the entire length of the body and a channel portion is defined at least in part by the body spaced from the tabular portion.

* * * * *